(12) United States Patent
Calm

(10) Patent No.: US 10,591,739 B2
(45) Date of Patent: Mar. 17, 2020

(54) NEAR-EYE-DISPLAY WITH RAPID SPHERICAL IMAGE SCANNING

(71) Applicant: George M Calm, Milpitas, CA (US)

(72) Inventor: George M Calm, Milpitas, CA (US)

(*) Notice: Subject to any disclaimer, the term of this patent is extended or adjusted under 35 U.S.C. 154(b) by 0 days.

(21) Appl. No.: 16/201,072

(22) Filed: Nov. 27, 2018

(65) Prior Publication Data
US 2019/0114950 A1    Apr. 18, 2019

Related U.S. Application Data

(63) Continuation-in-part of application No. 15/708,135, filed on Sep. 19, 2017, now Pat. No. 10,310,273.

(60) Provisional application No. 62/396,778, filed on Sep. 19, 2016.

(51) Int. Cl.

| G02B 27/01 | (2006.01) |
|---|---|
| G09G 3/00 | (2006.01) |
| G02B 27/00 | (2006.01) |
| G02B 27/28 | (2006.01) |
| G09G 3/36 | (2006.01) |
| G02B 5/30 | (2006.01) |

(52) U.S. Cl.
CPC ..... *G02B 27/0189* (2013.01); *G02B 27/0081* (2013.01); *G02B 27/0172* (2013.01); *G02B 27/283* (2013.01); *G09G 3/003* (2013.01); *G09G 3/36* (2013.01); *G09G 3/3696* (2013.01); *G02B 5/3025* (2013.01); *G02B 2027/0123* (2013.01)

(58) Field of Classification Search
CPC .. G02B 27/017; G02B 27/0172; G02B 27/01; G02B 27/0189; G02B 2027/0123; G02B 2027/013; G02B 5/30; G02B 5/3033; G02B 5/3025; G02B 27/26; G02B 6/0008; Y10T 428/1041; G02F 1/133528; G02F 1/13362; G02F 1/1393; G09G 3/003

See application file for complete search history.

(56) References Cited

U.S. PATENT DOCUMENTS

| RE27,356 E | 5/1972 | La Russa |
|---|---|---|
| 4,859,031 A | 8/1989 | Berman |
| 5,517,366 A * | 5/1996 | Togino ............... G02B 17/0804 359/364 |
| 5,659,430 A | 8/1997 | Togino |
| 5,966,242 A * | 10/1999 | Yamanaka ......... G02B 27/0172 359/618 |

(Continued)

OTHER PUBLICATIONS

Rolf R. Hainich, "Approaches to Ideal Freeform Mirror and Display Shapes for Augmented Reality", Freeform Mirrors and Displays for AR, 2012-2014.

*Primary Examiner* — Jia X Pan

(74) *Attorney, Agent, or Firm* — Antero Tormey Petrin; Pete Tormey

(57) ABSTRACT

A near-eye display that employs rapid spherical image scanning using liquid crystal retarder with concentric imaging and optical elements comprising a display with spherically curved concave image surface topped with a first polarizer; a spherically curved liquid crystal retarder composite reflector having a see-thru mirror topped at the concave side with electronically controlled liquid crystal retarder strips; a see-thru spherically curved mirror-polarizer composite with a mirror at the convex side and a second polarizer at the concave side; a frame to support, protect the device, and mount the device to the head.

6 Claims, 13 Drawing Sheets

(56) References Cited

U.S. PATENT DOCUMENTS

| | | | | |
|---|---|---|---|---|
| 6,853,491 B1* | 2/2005 | Ruhle | ............... | G02B 5/3016 |
| | | | | 359/630 |
| 7,639,208 B1 | 12/2009 | Ha | | |
| 2006/0232862 A1* | 10/2006 | Steven | ............... | G02B 3/14 |
| | | | | 359/489.07 |
| 2013/0033485 A1* | 2/2013 | Kollin | ............... | G06F 1/1637 |
| | | | | 345/419 |
| 2015/0002374 A1* | 1/2015 | Erinjippurath | ..... | G02B 27/0172 |
| | | | | 345/8 |
| 2015/0002940 A1* | 1/2015 | Nister | ............... | G02B 27/0172 |
| | | | | 359/630 |
| 2015/0370074 A1* | 12/2015 | McDowall | ......... | G02B 27/0172 |
| | | | | 349/11 |
| 2015/0378074 A1* | 12/2015 | Kollin | ............... | G02B 5/3016 |
| | | | | 349/185 |
| 2016/0026253 A1* | 1/2016 | Bradski | ............... | G02B 27/225 |
| | | | | 345/8 |
| 2016/0041390 A1* | 2/2016 | Poon | ............... | G02B 3/04 |
| | | | | 345/8 |

* cited by examiner

SECTION A-A

NEAR-EYE-DISPLAY WITH RAPID SPHERICAL IMAGE SCANNING

PRIORITY

This application is a continuation-in-part of co-pending U.S. patent application Ser. No. 15/708,135, filed Sep. 19, 2017 by the same inventor, which in turn claims the benefit of provisional patent application PPA #62/396,778 filed Sep. 19, 2016.

BACKGROUND

Some near eye displays (NEDs) are used in virtual reality (VR) devices. NEDs of VR devices have eyes enclosed from external view to effect immersive display. VR devices are optimal with minimum of 80 degrees field-of-view (FOV) so that the viewer does not seem to be looking out from the window with the edges of the view showing. NEDs in VR devices use combination of lenses to focus on small display or image source. The problem is that this train of lenses are uncomfortably long, complex and bulky to achieve the minimum FOV and large eye box. An eye has a FOV of around 200 degrees horizontal and around 135 degrees vertical with eye rotation included (no head movement relative to NED). The pupil of the eye can be in locations covering around ¾ of an inch cube eye box with eye rotation and being slightly far or near the NED.

NEDs having wide FOV and large eye box approaching these extents are ideal. Unfortunately, even the largest lens in NEDs that can be used in VR devices prohibits the NED from achieving a very wide FOV. Optical problems arise when the eye starts to rotate from the optical axis or move away from the focal plane. Attempts to solve these problems using concentric optical system did not produce satisfactory FOV or image quality. Prior concentric optical system for NEDs use combination of see-thru mirrors, polarizers, quarterwave retarders, and lens system to cut and fold the optical path. Unfortunately, light from the image source passes through and reflected from these elements so many times that the image quality becomes degraded so much.

There are NEDs used for see-thru or augmented reality (AR) devices. AR NEDs are similar to VR NEDs except AR NEDs can overlay the image to the external view. NEDs in AR devices have displays or image sources placed away from line of sight and use angled see-thru mirror or beam splitter to see the local display overlaid to the external view. These AR NEDs have an unsatisfactory FOV because the angled see-thru mirror prohibits the NED from having wide FOV. Prior concentric optical system for NEDs of AR devices have failed to produce wide FOV with good image quality.

NEDs in AR devices have an image from a local display overlaid against the external view. Dark parts of the image unfortunately turn light when set against bright external view. The image could be very hard to see against brightly colored external view. Masking or occluding systems to cover parts or the whole image of the local display from external view to control the opacity against the external view have been tried. Unfortunately, these attempts have met limited success.

In view of the foregoing, improvements to NEDs are wanted by the industry.

SUMMARY

Enclosed herein is, in one embodiment, a NED that employs rapid spherical image scanning using spherical liquid crystal retarder composite reflector with a display having a spherically curved concave image surface topped with polarizer. This may include a spherically curved concave composite reflector having see-thru concave mirror on the convex side and strips of electronically controlled liquid crystal retarder on the concave side, a spherically curved mirror-polarizer composite reflector with see-thru mirror at the convex side and polarizer at the concave side. These embodiments may have a frame to support, protect, and mount the device to a user's head. There are several advantages to the present disclosure such as:

Providing a NED that employs rapid spherical image scanning that produces "persistence of vision" to realize a wider FOV and larger eye box a folded optical path that makes the NED compact and still have satisfactory clearer view of the display Providing a bigger space between the eye and the NED, The ability for integrating a spherical digital imaging system with high resolution and wide FOV with occluding support.

DESCRIPTION

Generality of Invention

Figure 1:
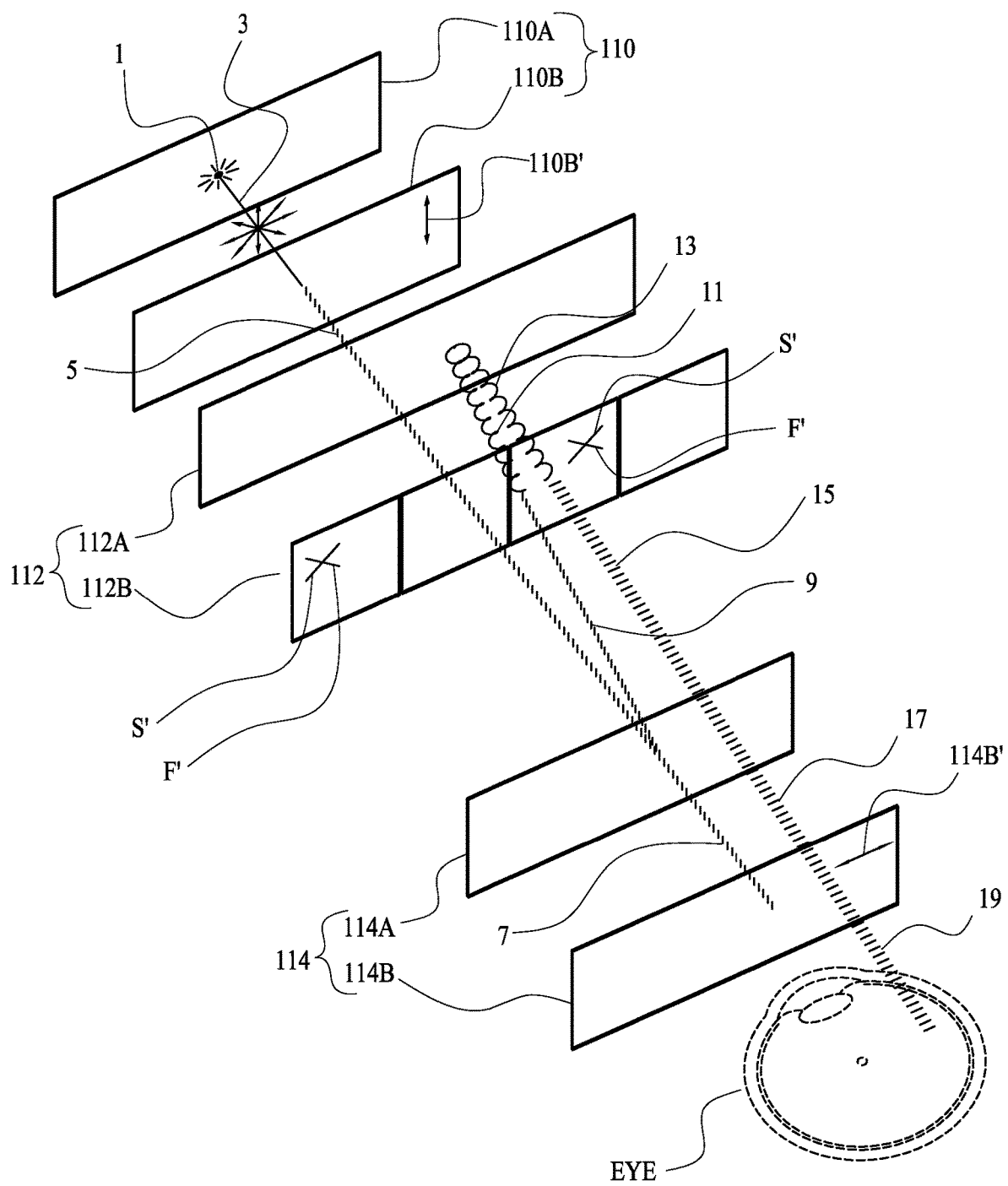
FIG. 1 is a diagrammatic isometric illustration for the paths of light from display point source to finally reaching an eye.
Figure 2A:
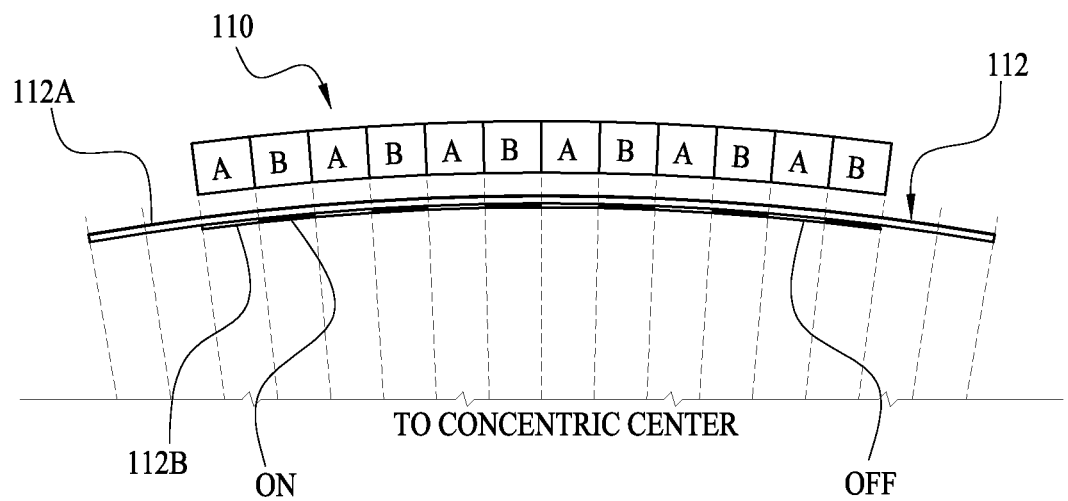
FIG. 2A is a graphic illustration useful in explaining spherical image scanning.
Figure 2B:
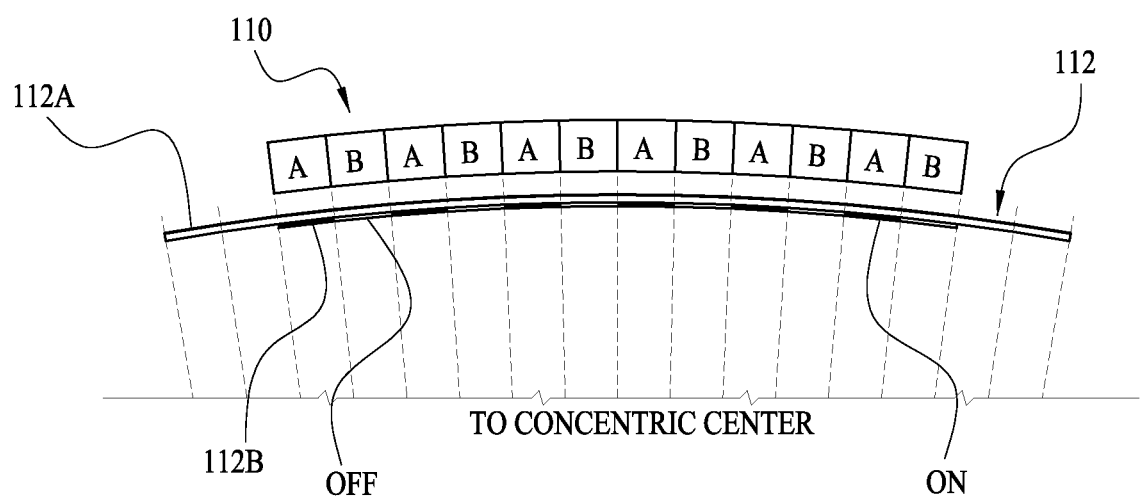
FIG. 2B is a graphic illustration useful in explaining spherical image scanning.
Figure 3A:
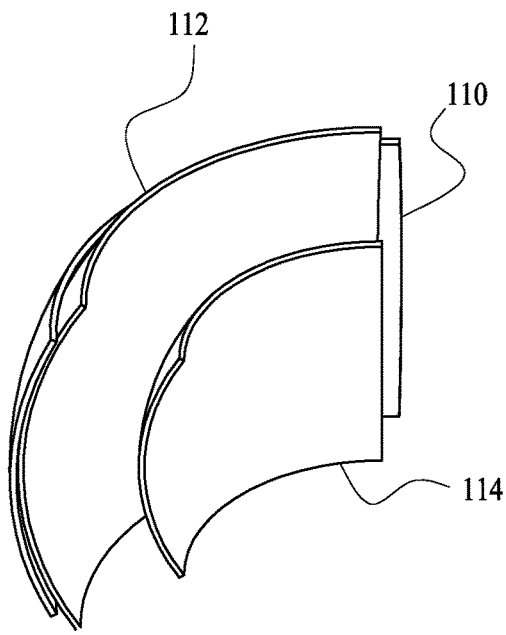
FIG. 3A shows isometric rear view of the NED.
Figure 3B:
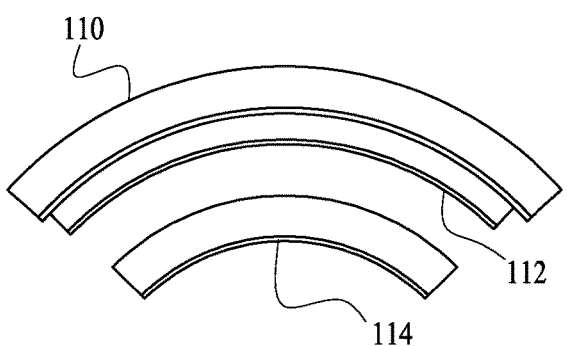
FIG. 3B shows top view of the NED.
Figure 3C:
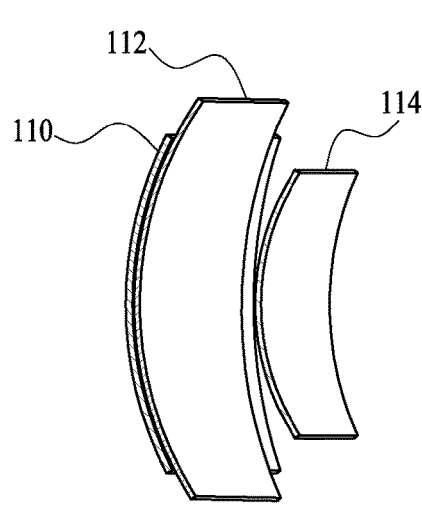
FIG. 3C shows Section A-A view from FIG. 3D.
Figure 3D:
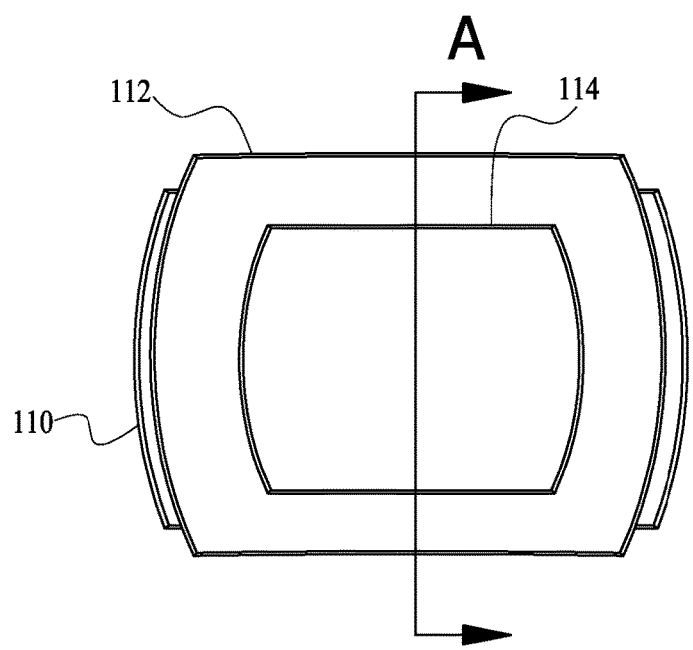
FIG. 3D shows rear view of the NED.
Figure 4:
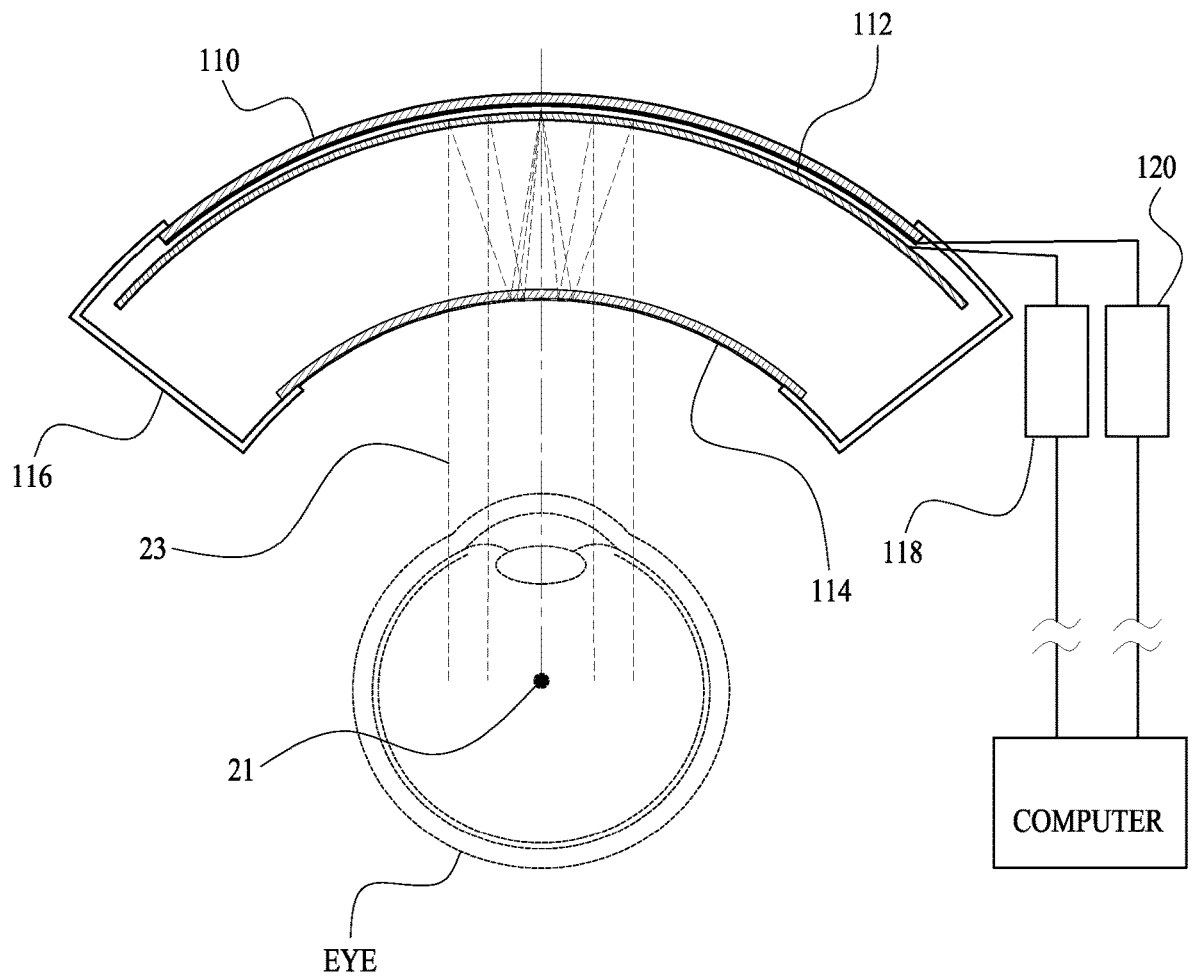
FIG. 4 shows cut-away plan view of the NED.
Figure 5:
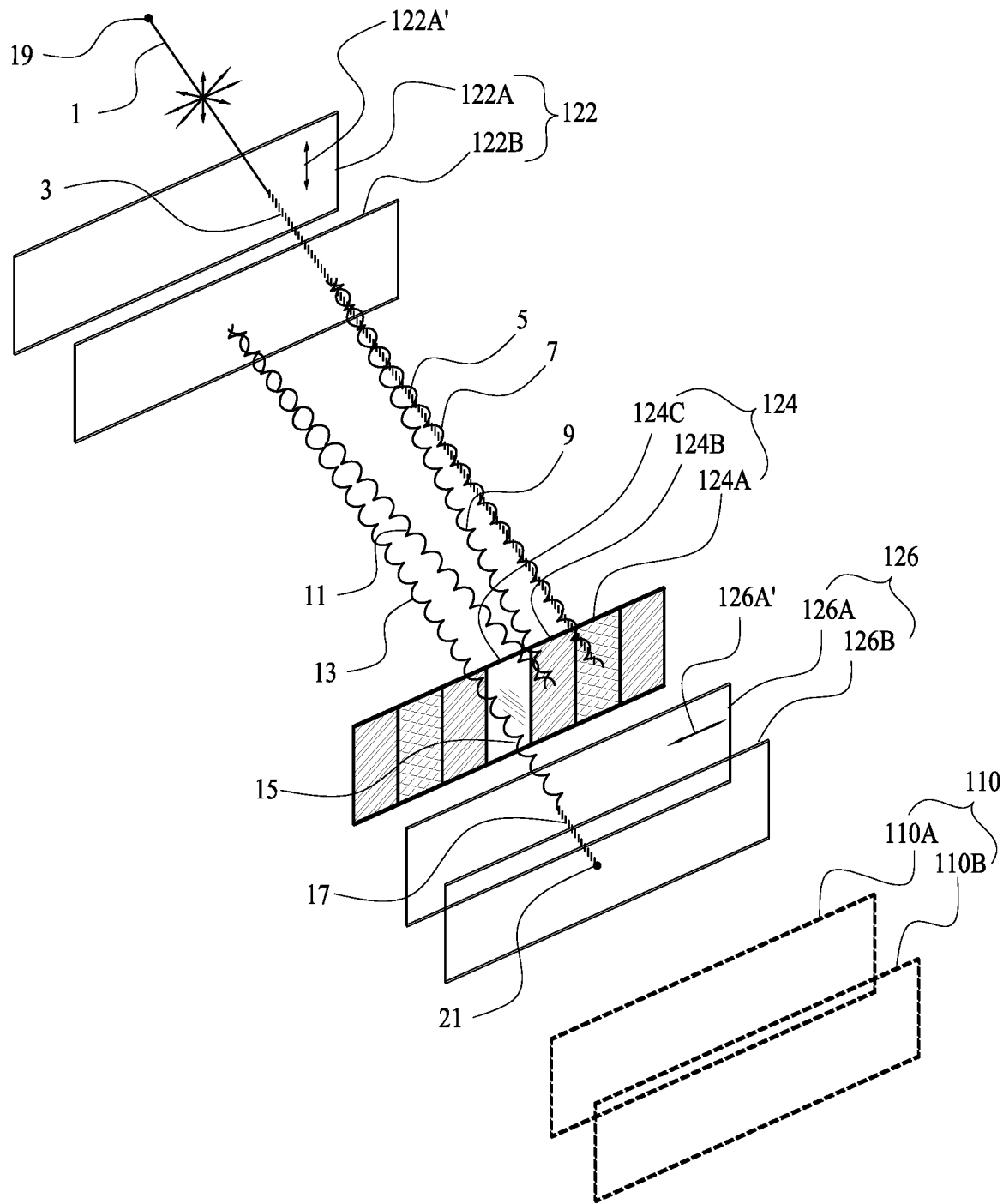
FIG. 5 is a diagrammatic isometric illustration of the spherical digital photographic system or external viewing system.
Figure 6A:
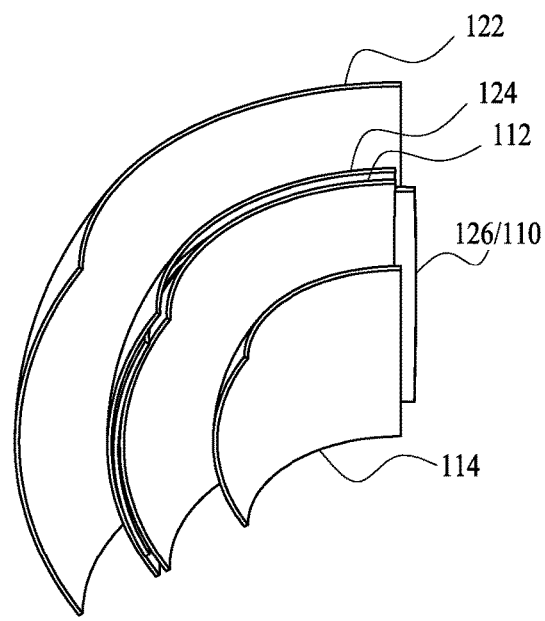
FIG. 6A shows rear isometric view of the NED with spherical digital photographic system.
Figure 6B:
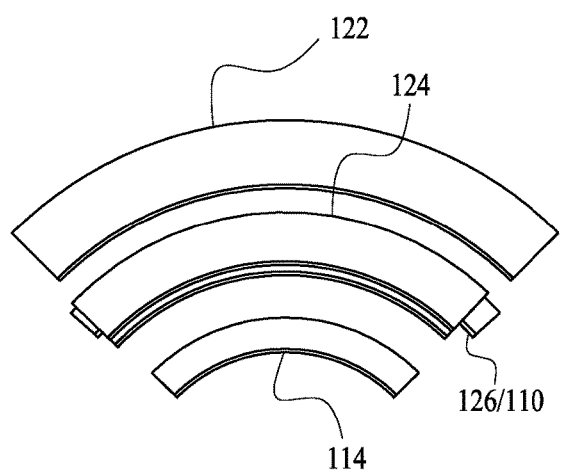
FIG. 6B shows top view of the NED with spherical digital photographic system.
Figure 6C:
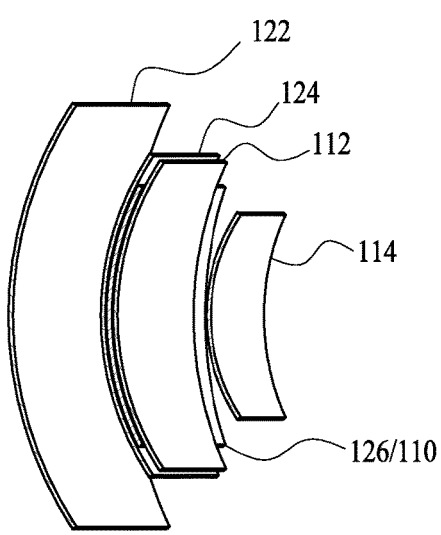
FIG. 6C shows Section A-A view from FIG. 6D of the NED with spherical digital photographic system.
Figure 6D:
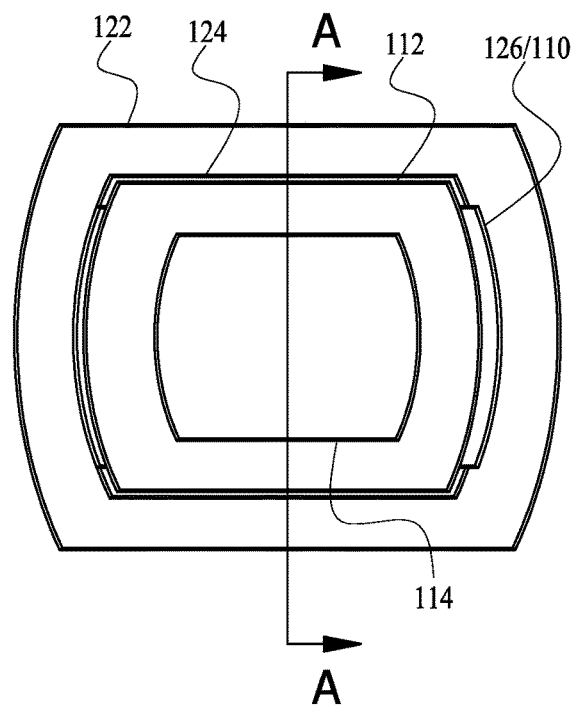
FIG. 6D shows rear view of the NED with spherical digital photographic system.
Figure 7:
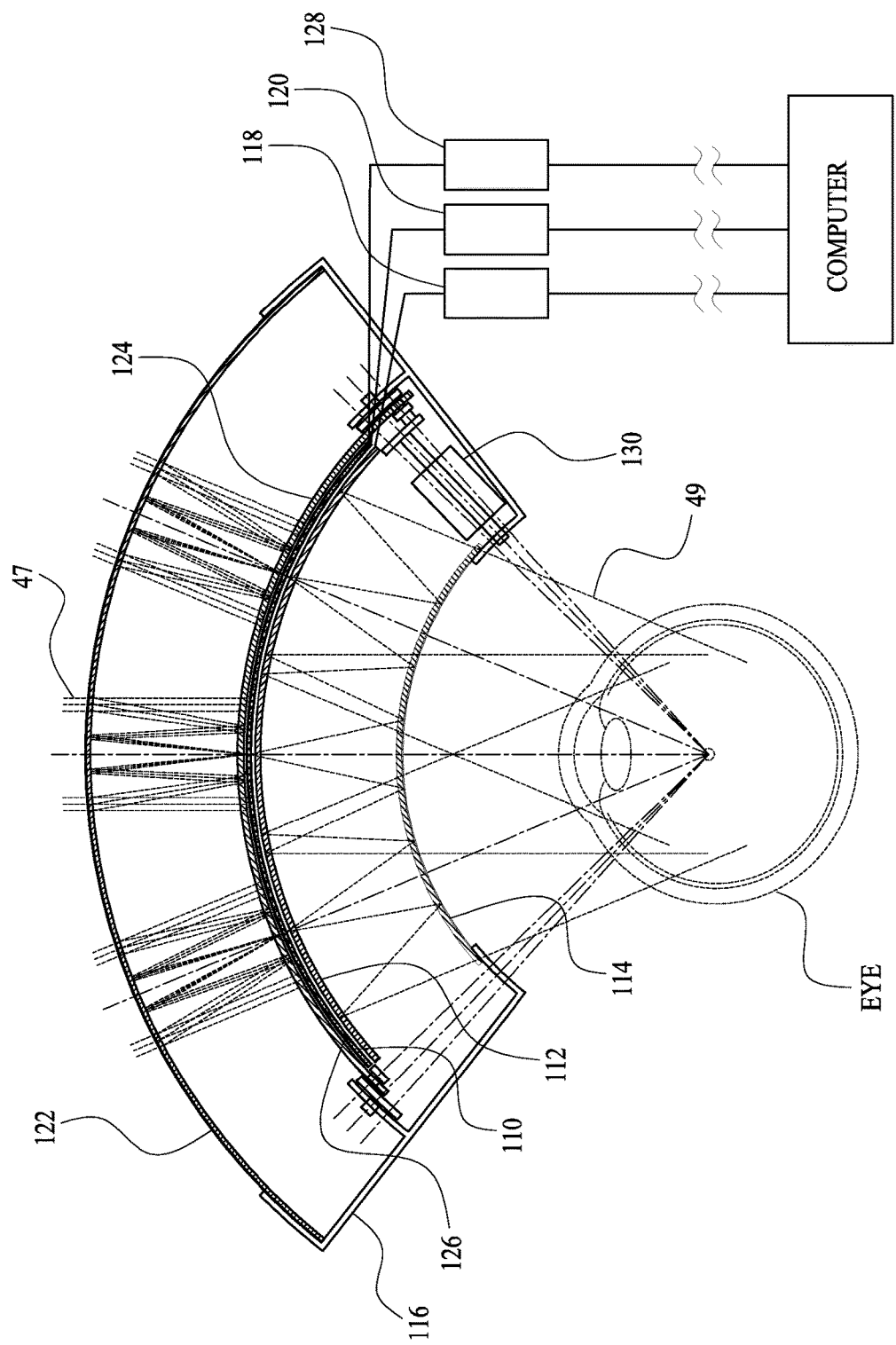
FIG. 7 shows cut-away plan view of the NED with spherical digital photographic system.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example, and without limitation, in cases in which a measure or value is "relatively increased" or "relatively more", that comparison need not be with respect to any known measure or value but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this disclosure" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIGS. 1 to 4

FIGS. 1 to 5 show an NED that employs rapid spherical image scanning using liquid crystal retarder composite reflector has a spherically curved polarized concave display 110 like spherically curved LCD displays. The display or image source can be see-thru for heads-up applications or opaque for VR applications. Alternatively, the display can be composed of spherically curved non-polarized concave display 110A like spherically curved OLED displays with the image showing at the concave side and topped by display polarizer 110B. Typical setup of the display is that it is controlled by the display controller electronics or circuits (120 of FIG. 4) and computer. The display polarizer 110B is assumed to have longitudinal polarizing orientation 110B' although other orientation will suffice. Concentrically at the concave side of the display polarizer (110B) is the spherically curved composite reflector (112). The composite reflector (112) is composed of spherical transparent base topped with see-thru concave mirror (112A) at the convex side and topped at the concave side by electronically controlled liquid crystal retarder strips (112B) which are alternately switched-on (ON) to become quarterwave retarders with the slow axis (S') oriented at around 45 degrees from polarizing orientation (110B') of display polarizer (110B) and fast axis (F') oriented at 90 degrees from the slow axis (S') and switched-off (OFF) to remain transparent by the controller electronics or circuits (118 FIG. 4).

Concentrically at the concave side of the composite reflector (112) is the see-thru convex mirror/polarizer (114). It is composed of spherical transparent base, topped with see-thru convex mirror (114A) at the convex side and topped at the concave side by exit polarizer (114B). The exit polarizer has latitudinal polarizing orientation (114B') or oriented at around 90 degrees from display polarizing orientation (110B'). The NED of current application is supported and mounted to the head by the frame and support (116 FIG. 4). The NED of current application can be see-thru for heads-up application or enclosed for VR application.

Operation

First Embodiment

The spherically curved concave display (110A) is the image source of the NED of current application. Light from a point on the display (1) is polarized by the display polarizer (110B). Let us assume that the display polarizer is set to polarize light to vertical orientation (110B'). When non-polarized light (3) from the light source (1) is transmitted by the polarizer (110B), light becomes vertically polarized (5). The polarized light (5) from the display (110) reaches the composite liquid crystal retarder reflector (112). Upon reaching the see-thru concave mirror (112A) about half of the polarized light (5) is reflected to fade and about half is transmitted. The transmitted polarized light (5) then encounters the transparent switched-off (OFF) liquid crystal retarder strip (112B) and then transmitted. The transmitted polarized light (5) reaches the composite convex reflector (114). Upon reaching the see-thru convex mirror (114A) about half is reflected (9) and about half is transmitted (7). The transmitted light which is vertically polarized (9) is blocked by the polarizer (114B) which is oriented 90 degrees from display polarizer (110B). The reflected polarized light (9) reaches the switched-on (ON) liquid crystal retarder which is actively a quarterwave retarder. The linearly polarized light (9) is transmitted as circularly right or circularly left polarized light (11). The circularly polarized light (11) reaches the see-thru concave mirror (112A). Half of the light is reflected in circularly opposite direction (13). The circularly polarized light (13) then reaches the switched-on (ON) liquid crystal retarder (112B) and transmits the circularly polarized light as horizontally oriented linearly polarized light (15). The horizontally polarized light (15) then reaches the see-thru convex mirror (114A) again. About half of the horizontally polarized light (17) is transmitted and reaches the polarizer (114B). This time, the horizontally polarized light is transmitted (19) from the polarizer (114B) and reaches the eye.

In operation the "A" parts of the display (110 FIG. 2A) reaches the eye. The liquid crystal retarder strips that are switched-on (ON) are switched OFF and the switched-off strips (OFF) are switched ON. This time, the "B" parts of the display (110 FIG. 2B) reaches the eye. This happens so fast that complete pictures are perceived by the viewer. When see-thru display is used, the image is overlaid to external view.

Alternative Embodiments

One alternative embodiment is similar to the first embodiment except the display or image source (110A) is replaced by cylindrically curved or flexible display. The fiber-optic faceplate (128) is topped at the cylindrically curved side by the display (102A) and topped at spherically curved concave side by the display polarizer (102B). Yet another embodiment may be used in VR applications. In an alternative embodiment the image source is from a cylindrically curved or flexible display (110A) and the image is relayed to the spherically curved concave side of the fiber-optic faceplate (128). Still another embodiment is one that it is not enclosed and uses see-thru display or that the display is topped at the convex side with LCD occluder or electronic mask.

FIGS. 1 to 7

These figures show a spherical photographic system (122, 124, and 126), which is the source of external image data that is processed and merged with local image data to feed the spherical display (110) working as external viewing system, is added on the convex side of the opaque spherical display (110). The external viewing system has spherical image sensor (126B). The image sensor is made up of photosensors that converts light into digital images for image processing and viewing. The image photosensor is topped at the convex side with polarizer (126A). The polarizer (126A) is assumed to have horizontal polarizing orientation (126A'). Close to the convex side of the spherical image photosensor with polarizer is the spherical composite reflector (124). The spherical composite reflector (124) is composed of transparent base with strips of retroreflective mirrors (124A), full mirrors (124B), and clear base (124C). The spherical composite reflector is mounted on cranks with motor (130) which is a spherically and circularly moving device. About ⅓ the radius of photosensor distance at the convex side of the composite reflector is the composite spherical composite see-thru reflector (122). The spherical composite see-thru reflector (122) is composed of a spherical clear base topped at the concave side with see-thru mirror (122B) and topped at the convex side with polarizer (122A). The polarizer is assumed to have vertical polarizing orientation (122A').

Operation

The first part of the operation is capturing the external view using the external viewing system. An unpolarized light ray (1) coming from external point (19) reaches the polarizer (122A) of the spherical composite see-thru reflector (122). The light is vertically polarized (3) then reaches the see-thru mirror (122B). About half of the light is reflected and the rest is transmitted (5). The transmitted light (5) is reflected by the retroreflector (124A, 7) to its origin at the see-thru concave mirror (122B). The retroreflected light (7) is elliptically or circularly polarized. About half of the light is transmitted out and the rest is reflected in (9). The reflected light (9) is circularly polarized at the opposite direction. Geometrically, the reflected light (9) should hit the full mirror (124B). The full mirror (124B) reflects the light (11) to the concave mirror (122B). About half of the light is transmitted out and the rest is reflected in (13). Geometrically, the reflected light should hit the clear base (124C) and transmitted (15). The transmitted light reaches and passes through the polarizer (126A) because the light (15) is circularly polarized. The light (17) is vertically polarized and finally reaches the image sensor (126B) and converted to digital image information by the electronics or circuits and computer. Strips or partial digital image is captured.

The cranks and motor assembly (130) when powered moves the composite reflector spherically and circularly along with counter balance (not shown) to prevent or minimize vibration. The clear strips on the composite reflector moves as scanning strips thereby completing the digital image captured. The scanning is so fast that suitable numbers of images are captured for video display. The captured external digital images are fed to the display for external viewing or merged with the display digital images for combined display. A three-dimensional digital map data of the scene can be used to implement or control occluding applications on both the external digital images and display digital images for augmented reality viewing. External light rays not retroreflected that passes through the clear base (124C) are vertically polarized and are blocked by the image sensor polarizer (126A).

FIGS. 1 to 7 and 20

These figures show embodiments where the spherical concave display is replaced by cylindrical or flexible display topped at the concave side with fiberoptic faceplate with spherically concave image surface. The image from the cylindrical display is relayed by the fiberoptic faceplate to the spherical concave surface.

In yet other embodiments, the spherical image sensor (126B) is replaced by cylindrical or flexible image sensor (142) that is topped at the convex side with fiberoptic faceplate with spherically convex surface (134). The convex surface of the fiberoptic faceplate is topped with polarizer (126A).

The operation is similar to previously described embodiments, except that the external image light that passes the polarizer (126A) is relayed by the fiberoptic faceplate to the cylindrical image photosensor (126B).

Figure 8:
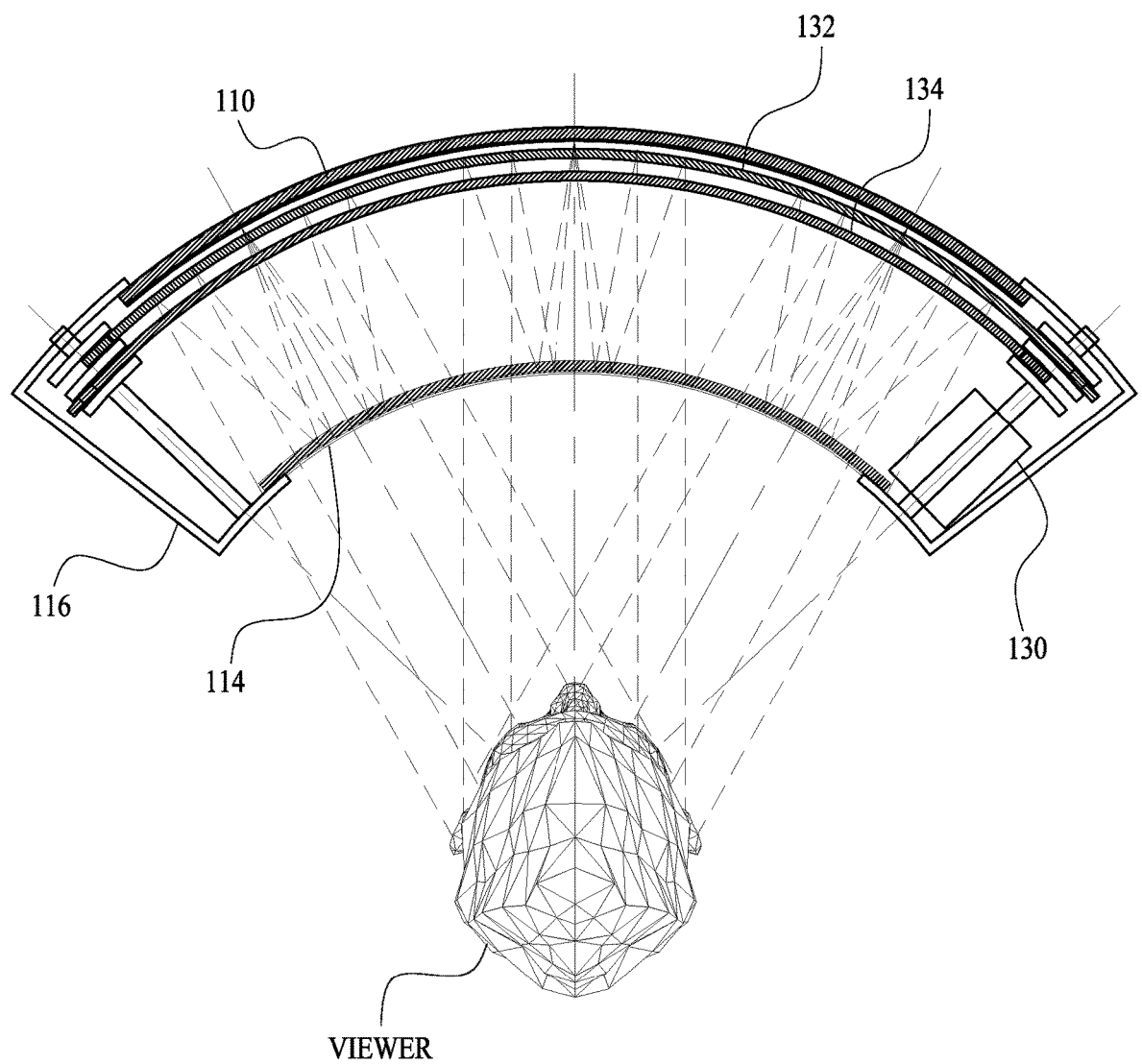
FIG. 8 shows cut-away plan view of a NED scaled larger to be used as bi-ocular viewing device.
Figure 9:
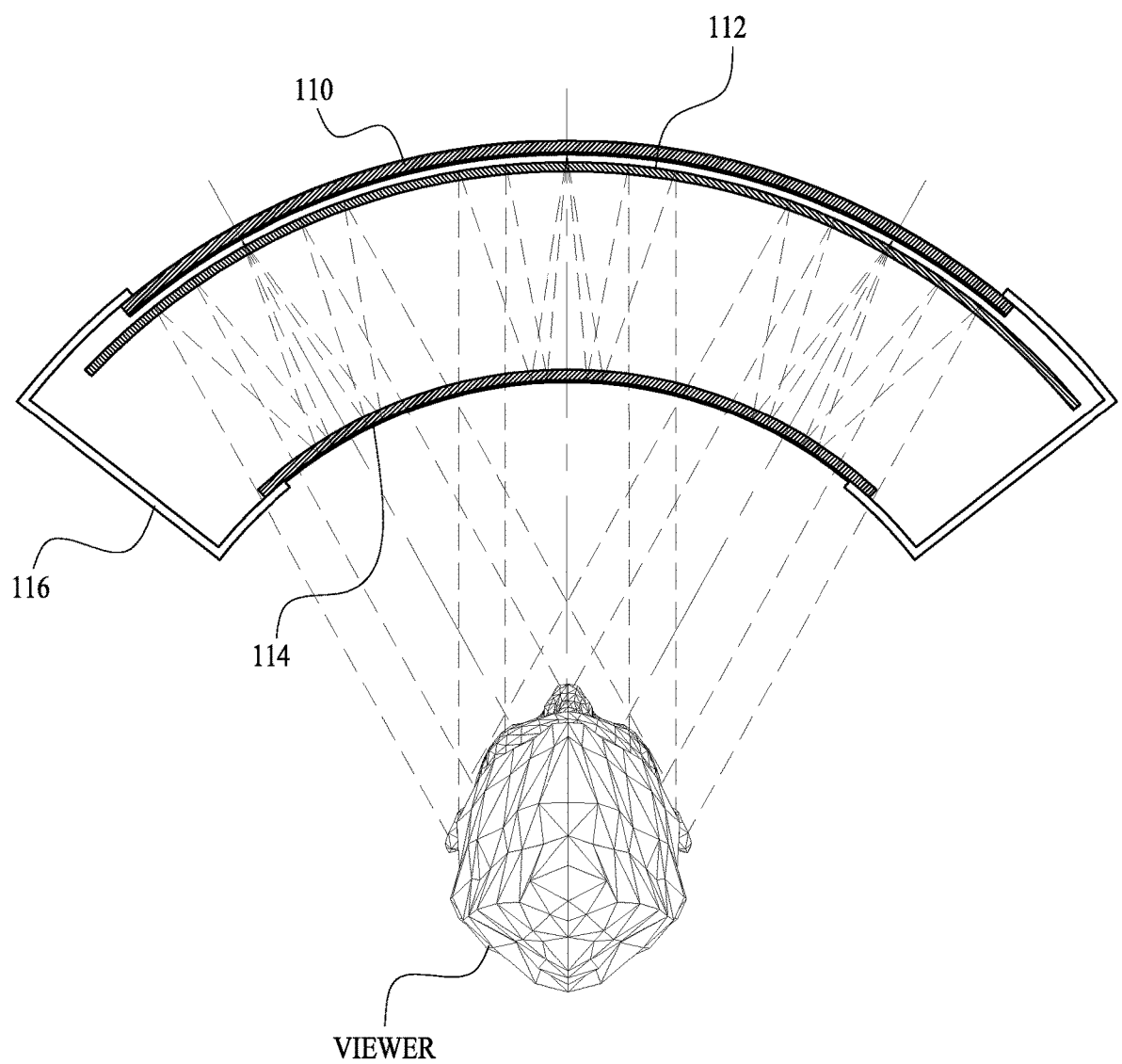
FIG. 9 shows cut-away plan view of the NED of the current application with spherical digital imaging system using liquid crystal retarder scaled larger to be used as bi-ocular viewing device.
Figure 10:
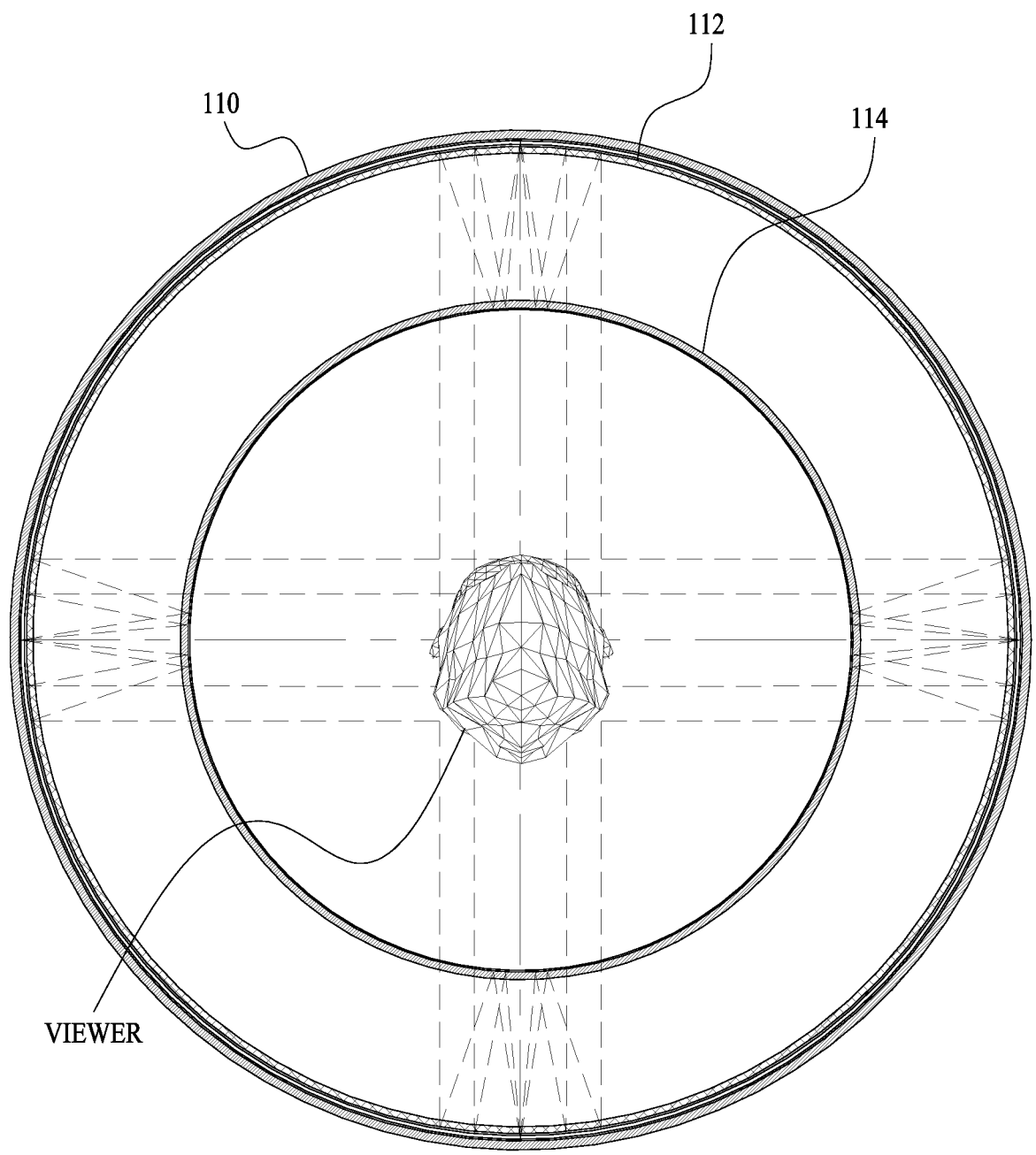
FIG. 10 shows cut-away plan view of the NED applicable the current application scaled larger and configured to 360 degrees as bi-ocular viewing device.
Figure 11:
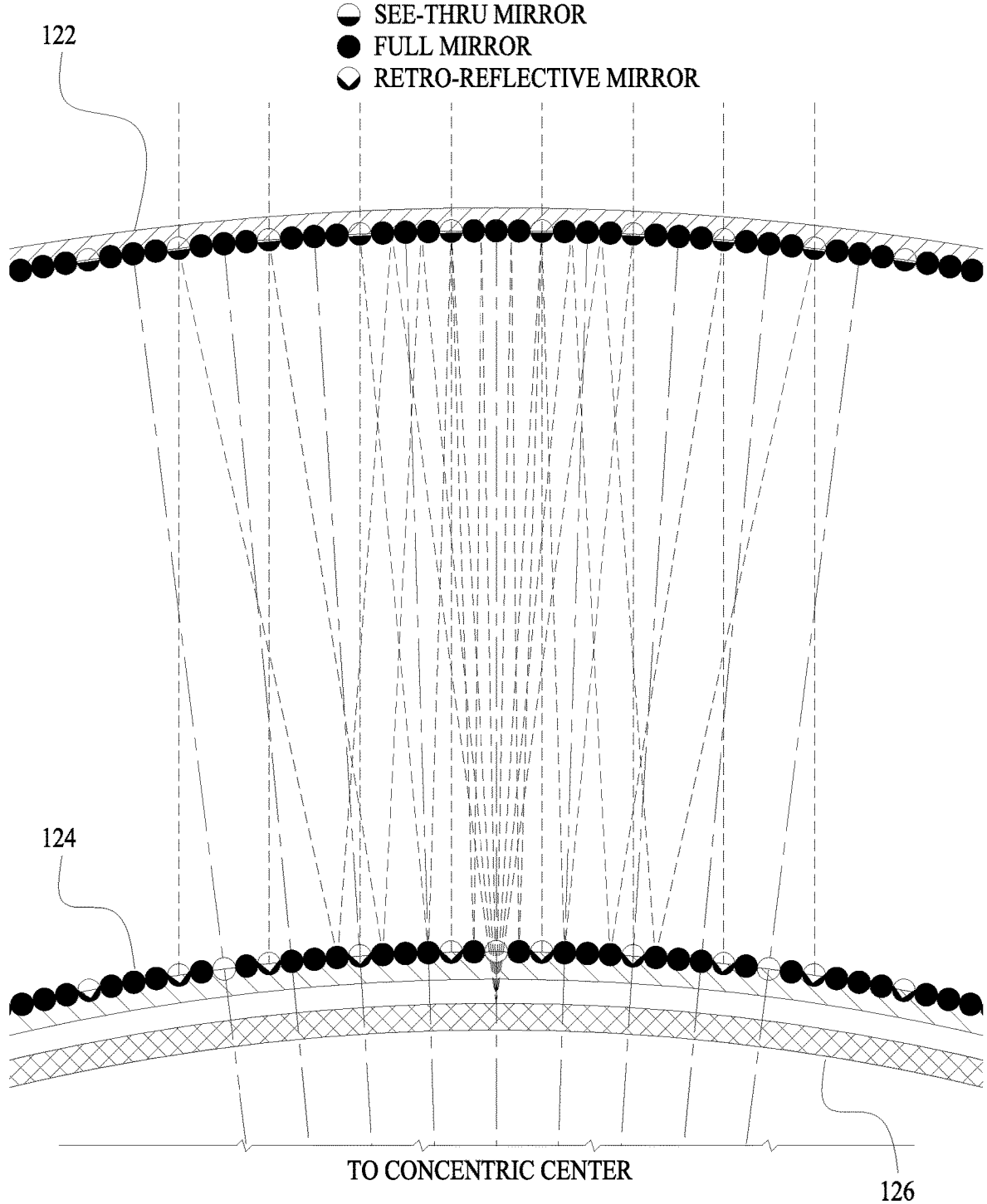
FIG. 11 shows spherical digital photographic system with composite concave reflector with full mirrors as alternative to the plain see-thru concave reflector.
Figure 12:
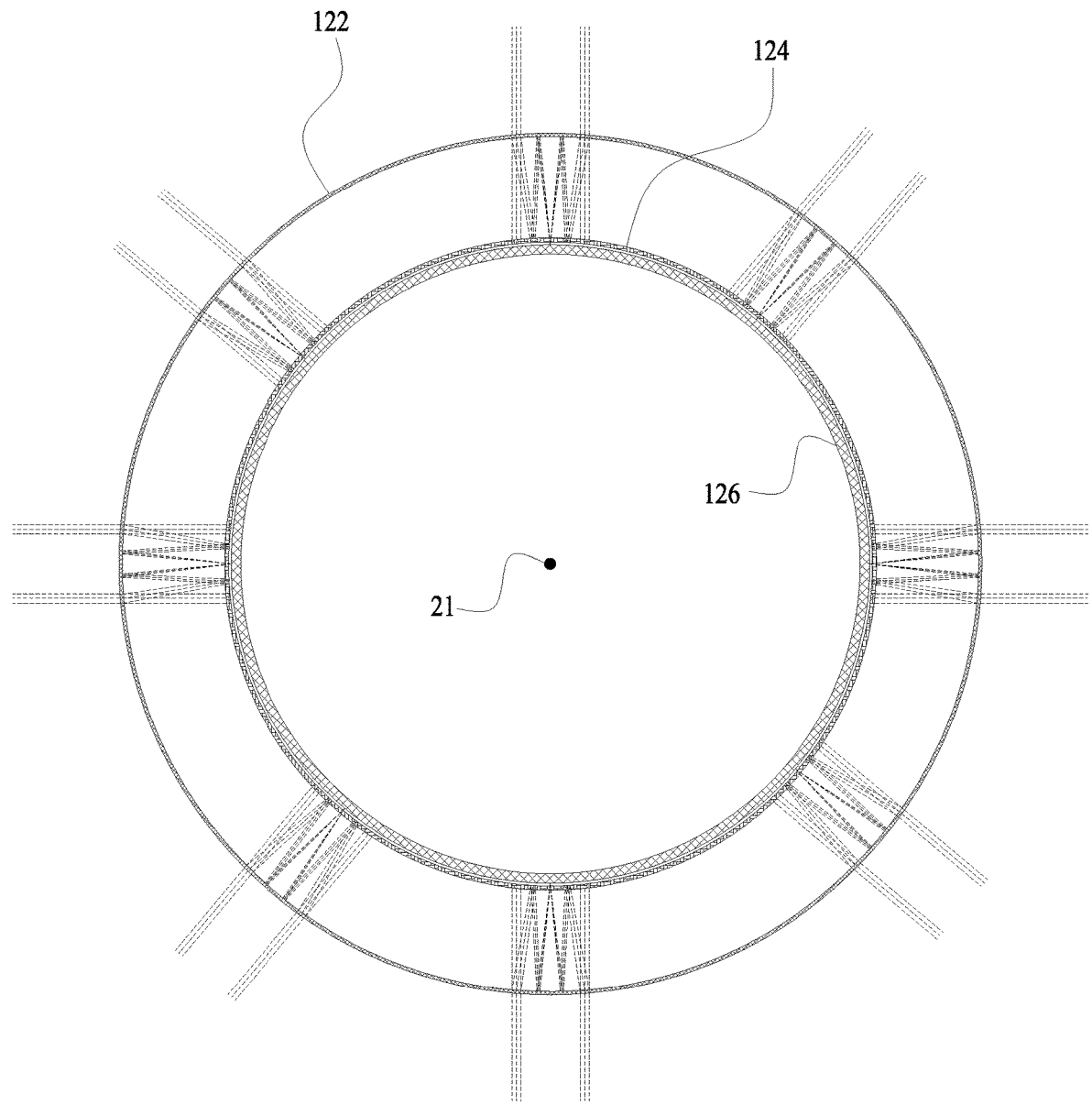
FIG. 12 shows cut-away plan view of the spherical digital photographic system applicable for the current application configured to 360 degrees.
Figure 13:
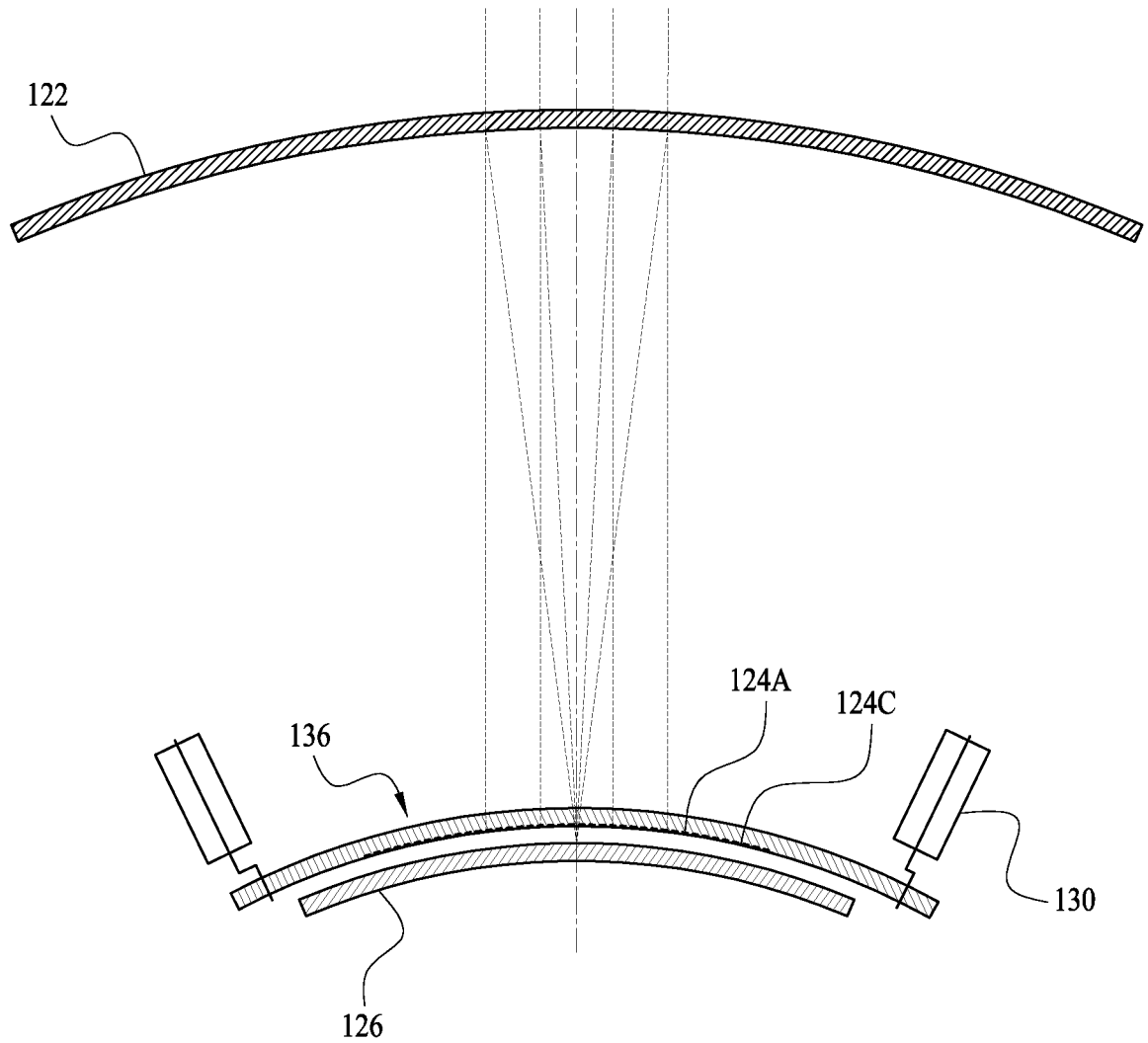
FIG. 13 shows cut away plan view of another embodiment of the spherical digital photographic system or external viewing system.

FIGS. 8 to 10

Here, the display is large enough for bi-ocular viewing application. The embodiment can also cover 360 degrees of field of view. With 360 degrees configuration, cranks are not used and the spherical composite reflector (124) is driven circularly over the spherical image sensor (126). This thereby gives all the advantages of bi-ocular viewing. The image is viewed from both left and right eyes. The image is like viewed beyond the screen producing bi-ocular viewing experience.

FIG. 11

In this embodiment full mirrors are added on the spherical composite see-thru reflector (122). Here, 75% of image light is reflected by full mirrors at the composite see-thru reflector (122) before passing through the clear bases at the composite reflector (124).

FIG. 12

In this embodiment, the external viewing device is used as a spherical image capturing device or camera. The embodiment can be configured up to 360 degrees of image capture. With 360 degrees of image capture, cranks are not used and the spherical composite reflector is driven circularly about the concentric center (21) over the spherical image photosensor (128). The image data is video streamed or stored in data storage device for printing and display purposes.

FIG. 13

In this embodiment the composite reflector (124) is replaced by a reflector with strips of clear base (124C) and retroreflective mirrors (124A). The other difference is that the radius of the external reflector (122) is approximately 2 times the radius of the photosensor (126) so that geometric reflections of light hits the clear base (124C) and focused on photosensor surface. The embodiment can also replace external the viewing system of fourth and fifth embodiments. The embodiment can also be configured up to 360 degrees of image capture.

Here, after light is retroreflected (124A) and reflected by see-thru composite reflector (122), it geometrically hits the clear base then reaches the spherical image photosensor (128) thereby reducing light bending.

Advantages

From the descriptions provided herein, a number of advantages of this disclosure become evident:
a) Fewer elements along the path of light from external view to the eye and fewer optical folding have been used to realize clearer view of the NED display.
b) Concave surface of the composite convex reflector (114, 114B) provided bigger space between the eye and NED to accommodate eyeglasses and other devices.
c) The shape of the NED concentric optical system can be more freely designed for aesthetic look.
d) The more than 180 field of view can be accommodated.
e) Occluding system which allows the external view and local display to be both controlled and merged into one can be fully realized.
f) The composite scanning reflector of patent application Ser. No. 15/708,135 is replaced by non-moving scanning composite reflector.
g) Moving bodies at the scene are captured instantly at their location even for 360 degrees image capturing applications.

In view of the foregoing, the reader will see that the near eye display device that employs rapid spherical image scanning using liquid crystal retarder of the various embodiments can be used as for various AR and VR applications that requires bigger FOVs than currently available, that is lightweight, and conveniently not bulky. In addition, the near eye display of current disclosure can be shaped aesthetically with negligibly or without compromising the balanced movement of parts. The near eye display of current application can also be made without moving parts.

Although the description above contains many specificities, these should not be construed as limiting the scope of the embodiments but as merely providing illustrations of some of several embodiments. For example, and without limitation, longitudinal polarizing orientation of the optical system can be oriented to different angle; other combinations of the embodiments can be used to satisfy user requirements; other spherically and circularly restraining device can be used to guide the spherically moving parts; other mechanical device or means to drive the moving parts spherically and circularly that achieves balancing can be used; other types of motors can be used to drive the cranks; slave cranks can be attached to a motor and be driving cranks as well; the counterbalance can be any number and in any shape like for example a ring shape or made up of any material as long as it counterbalances to reduce the vibrations to negligible or none; other choice of FOV can be used; this can be bi-ocular (single) or binocular (in pair); other display that produces spherically concave image can be used; other angles between crank shaft and crank arms can be used as long as all cranks arms have identical angles from crank shaft; the cylindrically curved display can be elliptically curved or free-form curved display. The composite liquid crystal strips can be also transparently set every third strip or more.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and, in a manner, consistent with the scope of the invention, as set forth in the following claims.

I claim:

1. A near eye display device comprising;
   a frame with concentric imaging and optical elements with said imaging element having a spherically curved concave image surface topped with a first polarizer;
   a spherically curved composite reflector, said composite reflector including a plurality of strips of liquid crystal retarder, said strips coupled to a controller circuit at the concave side, said composite reflector also including a see-thru mirror disposed on the convex side;
   a see-thru spherically curved mirror-polarizer composite, said mirror-polarizer composite including a see-thru mirror at the convex side and a second polarizer at the concave side;
   wherein the frame is operable to mount the device to a user's head.

2. The device of claim 1 wherein the said display device further includes an LCD occluder disposed on the convex side, said occlude coupled to a second controller circuit.

3. The device of claim 2 further including an external viewing system.

4. The device of claim 3 further including one or more guides operable to constrain said composite reflector and a counter balance of said external viewing system to spherical movements.

5. The device of claim 1 wherein said display device includes a fiber-optic faceplate on the concave side wherein the concave surface of the fiber-optic faceplate is topped with said first polarizer.

6. The device of claim 5 wherein said display device includes an LCD occluder coupled to the convex side with a second fiber-optic faceplate.

* * * * *